(12) United States Patent
Sharpe et al.

(10) Patent No.: US 7,849,467 B2
(45) Date of Patent: Dec. 7, 2010

(54) HANDLING A SIGNAL AT AN APPLICATION CONTEXT THAT EMPLOYS A REMOTE KERNEL SERVICE

(75) Inventors: Edward J. Sharpe, Los Gatos, CA (US); James Alan Woodward, Merrimack, NH (US); Jenchang Ho, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1703 days.

(21) Appl. No.: 11/031,120

(22) Filed: Jan. 6, 2005

(65) Prior Publication Data

US 2006/0150192 A1 Jul. 6, 2006

(51) Int. Cl.
*G06F 3/00* (2006.01)
*G06F 11/00* (2006.01)
(52) U.S. Cl. .................................... 719/310; 714/100
(58) Field of Classification Search .............. 719/319, 719/328, 310; 713/1; 714/100
See application file for complete search history.

(56) References Cited

U.S. PATENT DOCUMENTS

| 5,873,124 A * | 2/1999 | Draves .................. 711/202 |
| 2002/0112202 A1 * | 8/2002 | Buzby et al. ............ 714/48 |
| 2005/0005265 A1 * | 1/2005 | Knowles .................. 717/136 |

OTHER PUBLICATIONS

Huaigu Wu, Fault-tolerance for Stateful Application Servers in the Presence of Advanced Transactions Patterns, 2005.*

* cited by examiner

*Primary Examiner*—Lechi Truong (57) ABSTRACT

To handle a signal received at an application context that employs a remote kernel service implemented in a server context different from the application context, the remote kernel service receives from the application context a first signal. Using a signal action vector file associated with the server context, a first action code associated with the first signal is ascertained. If the first action code represents a pseudo-handler, the remote kernel service is aborted.

21 Claims, 11 Drawing Sheets

HANDLING A SIGNAL AT AN APPLICATION CONTEXT THAT EMPLOYS A REMOTE KERNEL SERVICE

RELATED APPLICATIONS

The invention is related to a commonly-assigned patent application entitled "SIGNAL MANAGEMENT IN OPERATIONS WITH MULTIPLE WAITS," U.S. Ser. No. 11/031,227.

BACKGROUND OF THE INVENTION

In certain operating systems, application code in an application context may sometimes need to utilize a kernel service to accomplish an operation. In a typical case, the application code sends a request to the kernel service. The kernel service then performs the requested operation on behalf of the application code, thereby enabling the application code to accomplish its operation through the kernel service.

Figure 1A:
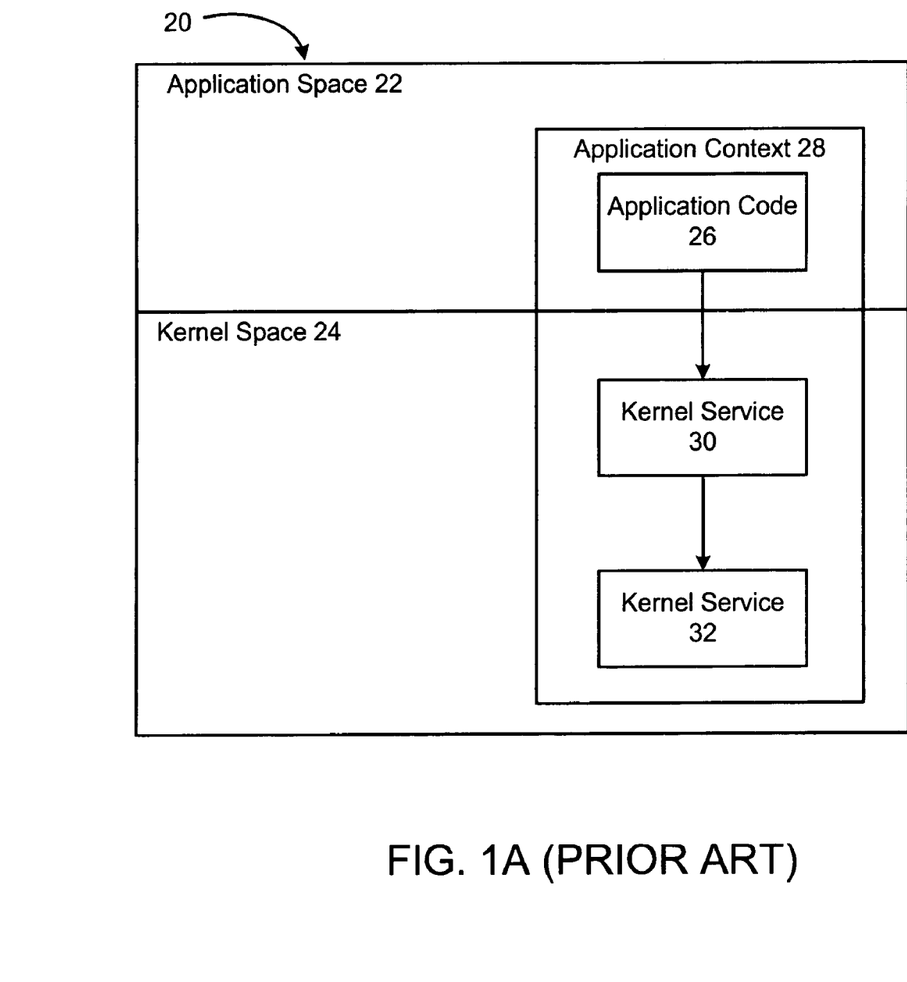
FIG. 1A, FIG. 1B, and FIG. 1C shows prior art local and remote services, without signal coordination FIG. 2A

The situation describes above can be managed with relative ease when both the application code and the kernel service reside in the same application context. To facilitate discussion, FIG. 1A shows an execution environment 20 including an application space 22 and a kernel space 24. Application code 26 is shown executing within an application context 28. As the term is employed herein, an application context represents an address (virtual memory point) and at least the application code. The application context may span both the application space and the kernel space. Within the same application context 28, there are shown two example kernel services: kernel service 30 and kernel service 32.

Application code 26 may sometimes require the use of kernel service 30 to accomplish a particular operation. In this case, application code 26 makes a call into kernel service 30 to request kernel service 30 to perform an operation on behalf of application code 26. In some cases, kernel service 30 may be able to perform the operation on behalf of application code 26 without calling on another kernel service. In other cases, kernel service 30 may require one or more other kernel services (such as kernel service 32) to perform yet other operations on behalf of kernel service 30. For example, kernel service 30 may need to access a file on the hard drive, and may utilize an I/O file service implemented by kernel service 32 to accomplish file I/O.

Figure 1B:
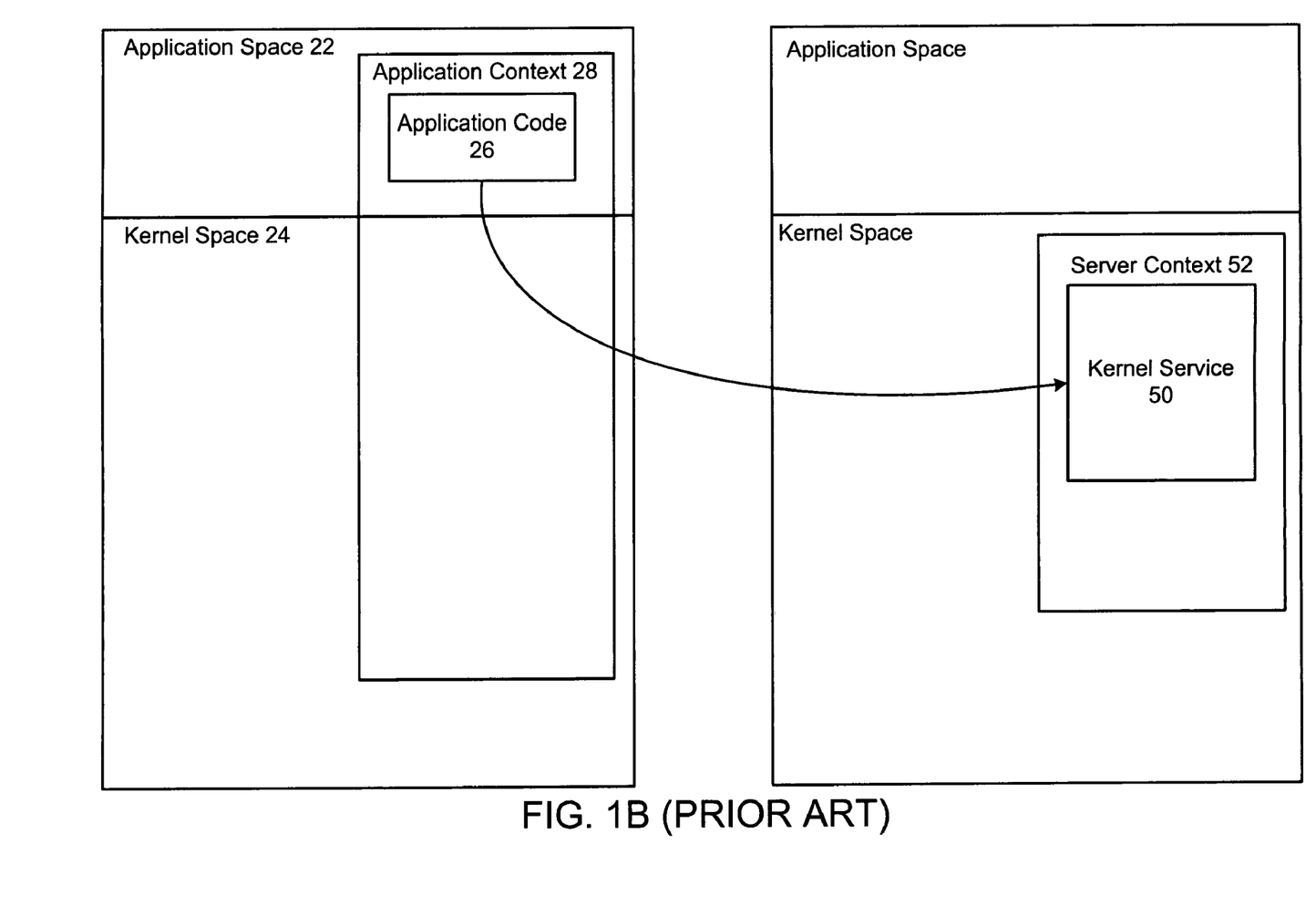
Figure 1C:
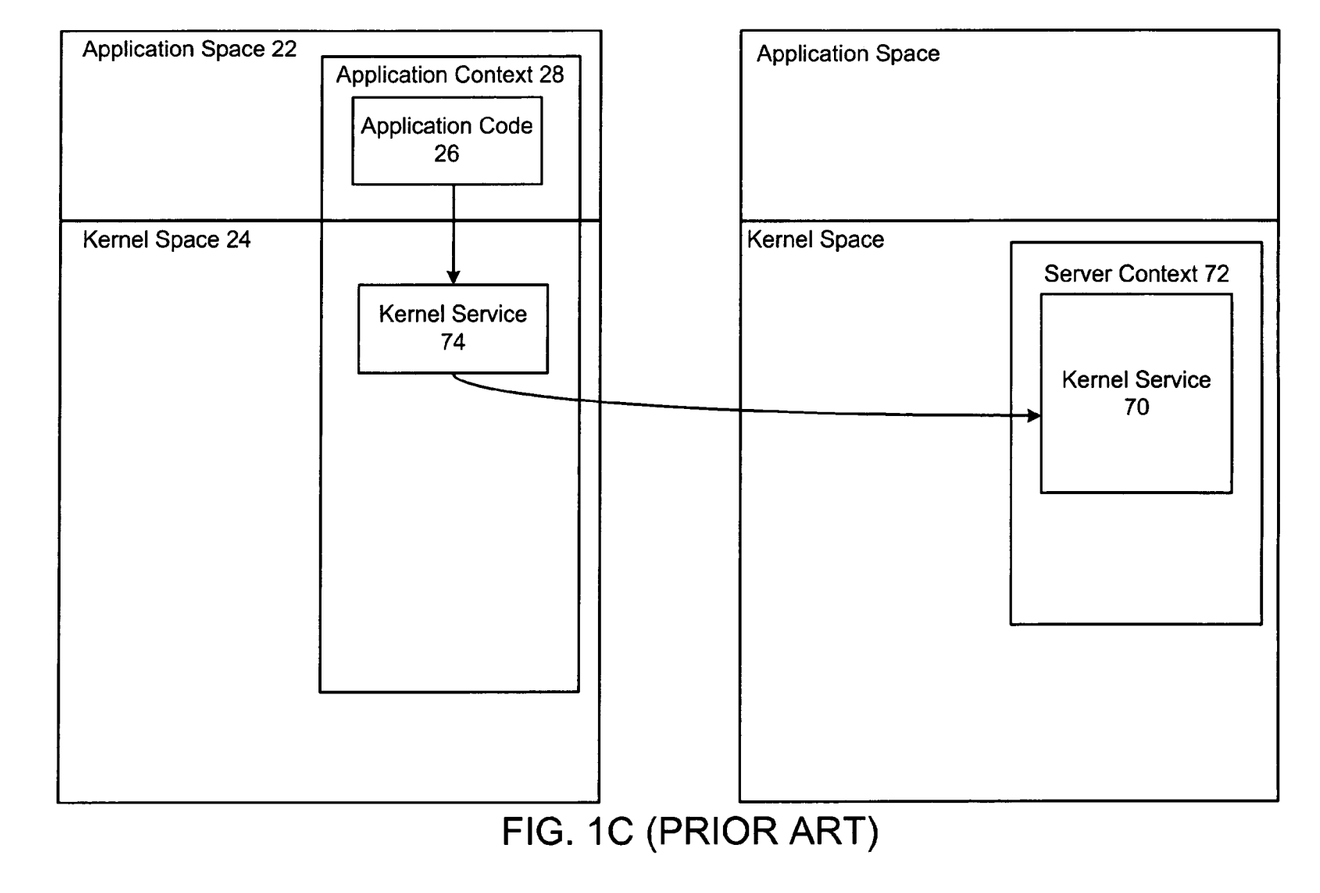

In the example of FIG. 1A, both kernel services 30 and kernel service 32 are local to application context 28 that is associated with application code 26. There are times, however, when one or more of the required kernel services do not exist in the same application context as the calling application code or the calling kernel service. FIGS. 1B and 1C show such examples. In FIG. 1B, remote kernel service 50 is shown residing in a different server context 52 from application context 28, which is associated with application code 26. In FIG. 1C, remote kernel service 70 is shown residing in a different server context 72 from application context 28, which is associated with application code 26 and the calling kernel service 74. As the term is employed herein, a server context represents an address space that resides in the kernel space and not in the application space.

When one or more of required kernel services are remote, i.e., they do not reside in the same application context as the calling application code or the calling kernel service, complications can arise with respect to signal handling by the various components and contexts involved in the operation if the remote kernel service is in the wait mode. A kernel service may be in a wait mode because it is waiting for some data or services, for example.

With respect to the example of FIG. 1C, remote kernel service 70 may need to obtain a particular data file from the hard drive on behalf of kernel service 74 (which may be asking for the data file on behalf of application code 26). Thus, remote kernel service 70 may issue a read command to the hard drive subsystem, and may enter a wait mode to wait for the data file to be returned by the hard drive subsystem. While remote kernel service 70 is in its wait mode, another component involved in the operation, such as application code 26 or kernel service 74 for example, may be receiving a signal that may require its immediate attention.

If the newly received signal requires the immediate attention of application code 26, for example, remote kernel service 70 may need to abort its current operation, thereby allowing other components involved in the pending operation (such as kernel service 74 and application code 26) to also abort. After all components successfully abort, the new signal can be attended to.

However, not all received signals merit aborting of the current operation. For example, aborting is not appropriate in all cases as a default response to a received signal. Accordingly, the handling of received signals while a remote kernel service is in its wait state needs to be carefully coordinated among the components and contexts involved in an operation to avoid inefficiency and/or to avoid error.

As mentioned earlier, when the kernel service is local to the calling application code or the calling kernel service (i.e., residing in the same application context), signal handling is relatively simple. Peculiarities pertaining to operating system (OS) organization and operation, which will be described herein, make such coordination challenging when one or more of the kernel services are remote. The coordination to facilitate efficient handling of signals received when a remote kernel service is in its wait state is the subject of this application.

SUMMARY OF INVENTION

The invention, relates in one embodiment, to a computer-implemented method for handling a signal received at an application context. The application context employs a first remote kernel service implemented on a first server context different from the application context. The method includes receiving at the first remote kernel service from the application context a first signal ascertaining, using a first signal action vector file associated with the first server context, a first action code associated with the first signal. The method also includes, if the first action code represents a pseudo-handler, aborting the first remote kernel service.

In another embodiment, the invention relates to an arrangement for handling a signal received at a server context via a remote procedure call. The signal represents a request to employ a kernel service associated with the server context on behalf of one of a calling application code associated with a different application context and a calling kernel service associated with the different server context. The arrangement includes a pseudo-handler signal action vector (SAV), the pseudo-handler SAV including a file of signal numbers and corresponding pseudo-handlers, each of the pseudo-handlers mimicking a handler address without being corresponded to a meaningful address. The arrangement also includes means for consulting the pseudo-handler SAV to ascertain whether the signal corresponds to a pseudo-handler of the pseudo-handlers and for aborting a wait state of the kernel service if the signal corresponds to the pseudo-handler in the pseudo-handler SAV.

In yet another embodiment, the invention relates to an article of manufacture comprising a program storage medium having computer readable code embodied therein. The computer readable code is configured to handle a signal received at an application context in which the application context employs a first remote kernel service implemented on a first server context different from the application context. The article of manufacture also includes computer readable code for receiving at the first remote kernel service from the application context a first signal ascertaining, using a first signal action vector file associated with the first server context, a first action code associated with the first signal. The article of manufacturing further includes computer readable code for aborting, if the first action code represents a pseudo-handler, the first remote kernel service.

These and other features of the present invention will be described in more detail below in the detailed description of various embodiments of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A and FIG. 3B are handled.

DETAILED DESCRIPTION OF VARIOUS EMBODIMENTS

The present invention will now be described in detail with reference to various embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover an article of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out operations pertaining to embodiments of the invention. Examples of such apparatus include a general purpose computer and/or a dedicated computing device when appropriately programmed and may include a combination of a computer/computing device and dedicated/programmable circuits adapted for the various operations pertaining to embodiments of the invention.

As mentioned above, the coordination among the various components and contexts to handle an incoming signal, which is received while a kernel service is in its wait (sleep) state is challenging when the wait-state kernel service is a remote kernel service. As the term is employed herein, a remote kernel service is a kernel service that resides in a context that is different from the application context associated with the calling application code or from the calling kernel service.

Generally, the operating system (OS) decides whether the request is to be performed within the application context or by a separate server context. If some or all of the data/device needed is not available locally (i.e., within the same application context), the OS may invoke a call to a remote kernel service, which may perform part of the operation. Further, the remote kernel service may make a call to another remote kernel service in order request the other remote kernel service to perform part or all of the operation. As can be seen, there are various permutations of how many kernel services, either locally or remotely, may be called upon to service a request.

Figure 2A:
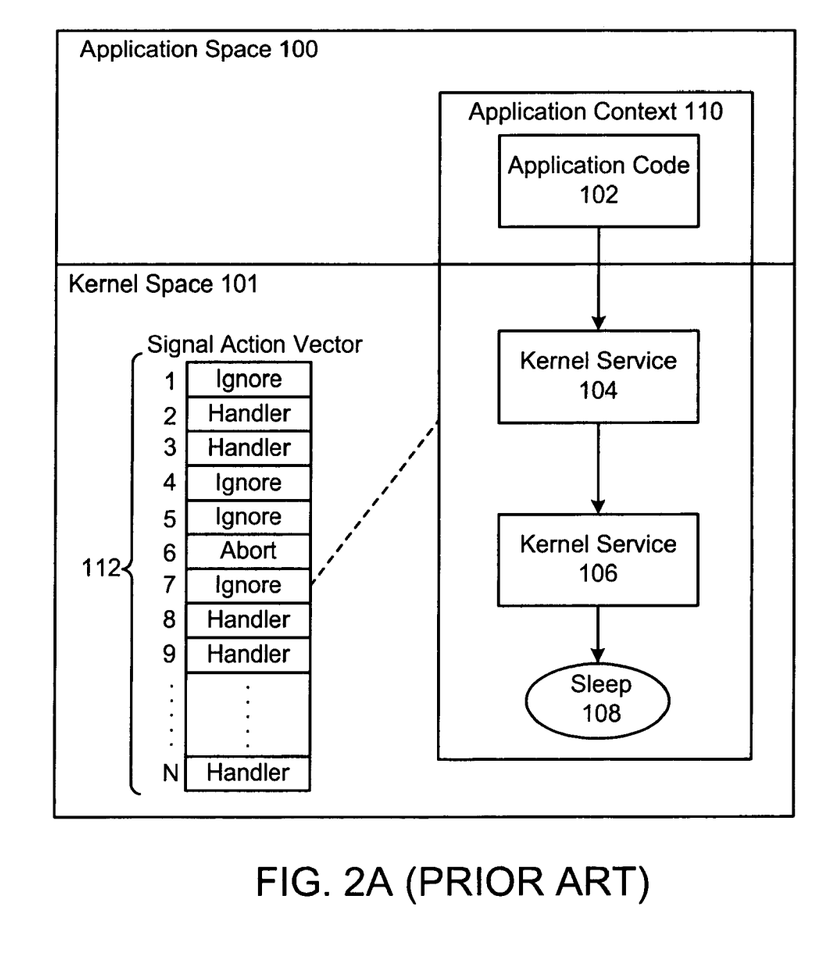
Figure 2B:
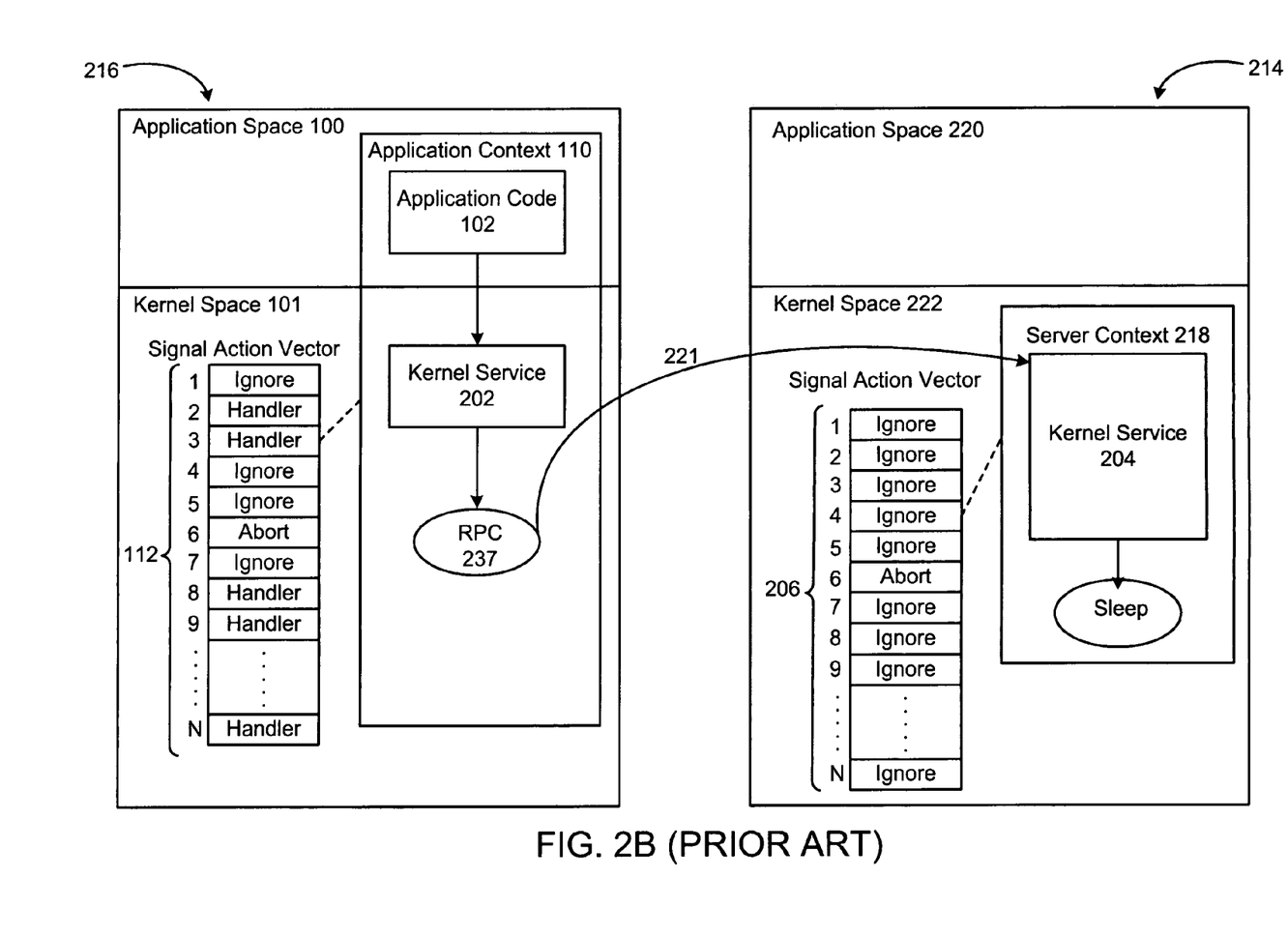
FIG. 2B shows prior art signal handling with local services, and problem with remote services.

To facilitate discussion, prior art FIGS. 2A and 2B contrast between an execution environment in which all data/services can be obtained locally to perform a certain operation (FIG. 2A) and an execution environment in which a remote kernel service is required to perform a certain operation (FIG. 2B).

Referring now to FIG. 2A, there is shown an application context 110, which spans both an application space 100 and a kernel space 101. Application code 102 makes a call into the system to invoke a local kernel service 104. Kernel service 104 then invokes another local kernel service 106 to perform an operation on behalf of application code 102 (such as to request for a file from the I/O subsystem). All data/services required can be furnished or obtained by application code 102, kernel service 104, and/or kernel service 106. As can be seen from FIG. 2A, application code 102, kernel service 104 and kernel service 106 are all located within application context 110. Accordingly, no remote services are required to perform the operation in the example of FIG. 2A.

Suppose kernel service 106 needs to wait for the I/O subsystem to respond. While waiting, kernel service 106 is in a sleep mode. While kernel service 106 is in a sleep mode 108, application context 110 is interrupted by an incoming signal. As known in the art, signal is one of the mechanisms employed for the delivery of events to an application context.

Application context 110 forwards the received signal into the kernel space. The OS signal handling mechanism receives the signal and consults a signal action vector (SAV) file 112 to determine how the signal is to be handled. As the term is employed herein, a SAV file, which is usually set up by the application context or the server context, relates to a signal action vector (indexed by signal numbers) and the corresponding action codes. In the example of FIG. 2A, the signals numbered 1 . . . N and their corresponding action codes are shown. Common action codes may include abort (stop current operation), ignore (do not disturb the operation), and handler (stop current operation so that the application may process the signal by launching the handler code).

If the action code associated with the received signal in SAV file 112 represents an abort, the OS wakes up kernel service 106 to perform the abort. Kernel service 106 cleans up it in-progress states, aborts and sends a response back to kernel service 104. Kernel service 104 then cleans up it in-progress states, aborts and notifies the OS of the abort. Since the action code represents an abort, the OS aborts the application context and all processing stops. On the other hand, if the action code associated with the received signal represents an ignore, then the OS ignores the received signal and takes no action.

As another example, if the action code associated with the received signal in the SAV file 112 represents a handler, the OS wakes up kernel service 106 to abort kernel service 106 in preparation for launching the handler. Kernel service 106 cleans up its immediate states, aborts and sends a response to kernel service 104. Kernel service 104 then cleans up, aborts and notifies the OS of the abort. Since the received signal represents a handler (which contains an address), the system is able to return to a specific section in the application code to process the signal.

As can be seen in FIG. 2A, it is relatively simple to handle a received signal when kernel service 106 is in the same application context 110 as application code 102 since the information needed (such as a common SAV file, handlers and signal masks) to handle the received signal is readily available within the same application context.

However, when an operation needs to employ a remote kernel service, complications may arise in the handling of an incoming signal while the remote kernel service is in its wait (sleep) state. To further elaborate, reference is now made to prior art FIG. 2B. Unlike the situation in FIG. 2A, at least part of the data/service that application code 102 of FIG. 2B needs to carry out its operation is located outside of local application context 110 (i.e., outside of the application context associated with the application code). In the current example, assume that the required data/service is a remote kernel service that is called by a local kernel service.

As the term "remote" is employed herein, the kernel service may be remote because that kernel service is located in a different context (e.g., server context) from the application context associated with the application code. Note that the required kernel service in this example is deemed remote irrespective whether the context associated with that required kernel service resides in the same node with or in a different node from the node associated with the local application context.

Referring now to FIG. 2B, application code 102 calls local kernel service 202, which requires the service of a remote kernel service 204 located in a remote kernel context 218. Accordingly, the OS associated with application context 110 makes a remote procedure call (RPC) 237 via path 221 to remote kernel service 204 in server context 218.

For ease of discussion, application context 110 is associated with a node 216 while server context 218 is associated with a node 214 (which has its own application space 220 and kernel space 222). Note that server context 218 also has its own SAV file 206. Thus, the operation initiated by application code 102 now involves not only a remote kernel service 204 but also another SAV file 206 (in addition to SAV file 112 associated with local application context 110). The involvement of multiple SAV files complicates signal handling, as will be discussed herein in connection with subsequent prior art FIGS. 3A and 3B.

Figure 3A:
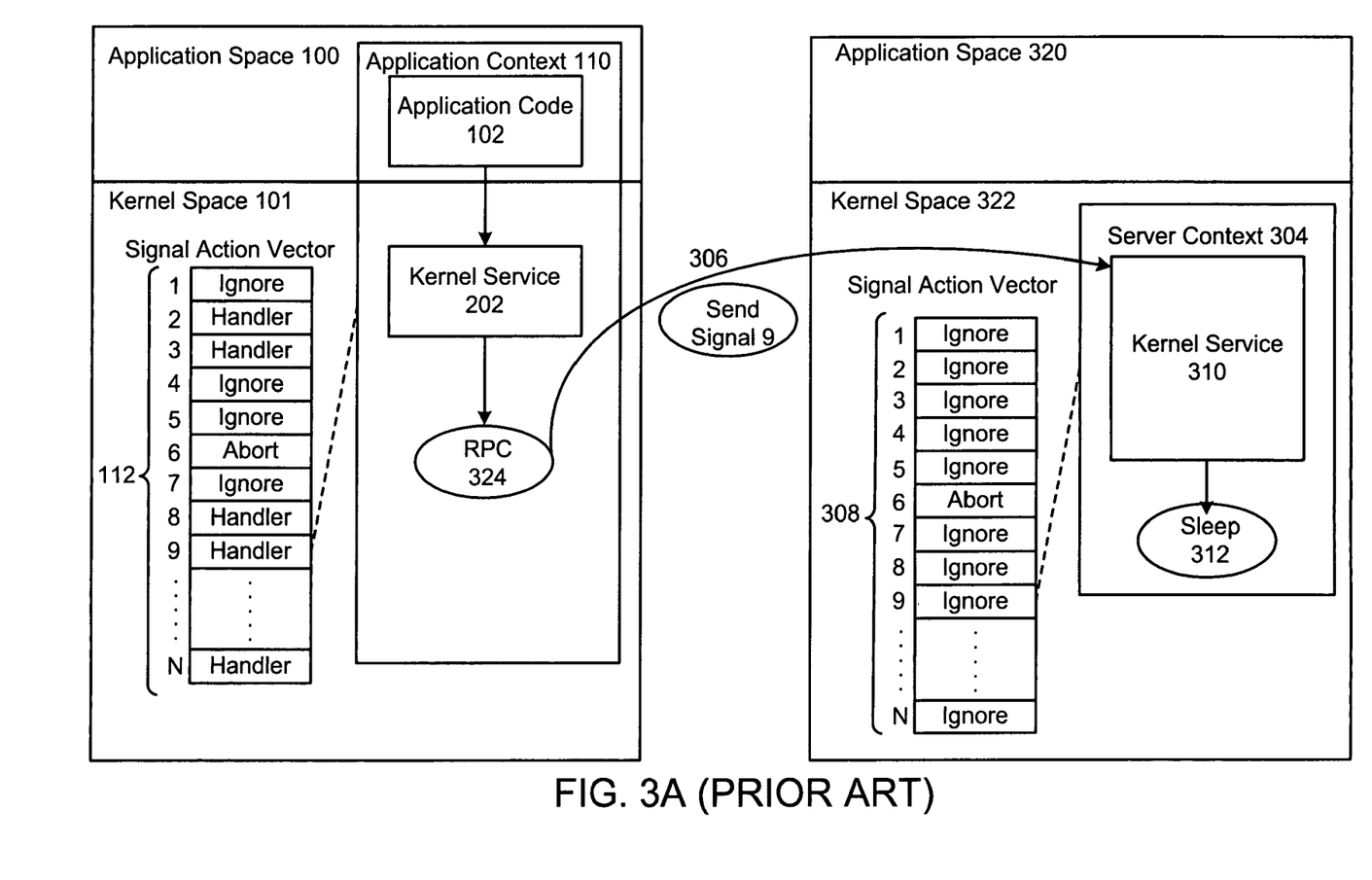
FIG. 3A and FIG. 3B illustrates prior art attempt at signal coordination with remote services, and problems with two cases.

Prior art FIG. 3A illustrates a prior art approach to handling a signal received at application context 110 while the remote kernel service is in the sleep mode. In FIG. 3A, suppose that the previous operation taken by application code 102 requires the use of a remote kernel service 310, which is called upon by a remote procedure call 324. Remote kernel service 310 is disposed with a remote server context 304. Note that the SAV file 308, associated with server context 304, has the system default actions, not those of the application context 110. For ease of illustration, remote server context 304 is disposed in a separate node from the node associated with application context 110 and has an application space 320 and a kernel space 322.

Remote kernel service 310 is in a sleep state 312 when a signal is received at local application context 110. In the case of FIG. 3A, the OS signal handling mechanism associated with application context 110 then forwards the signal verbatim (e.g., signal # 9) using a RPC 324 via a path 306 to server context 304. Upon receipt of the signal, the OS signal handling mechanism associated with server context 304 consults SAV file 308 (having system default actions), which is associated with server context 304, to determine the action to be taken with respect to the received signal. Since the signal # 9 represents an action code of "ignore" in SAV file 308, the OS does not disturb kernel service 310 from its sleep 312.

One disadvantage of the approach of FIG. 3A is that the response to a received signal may vary depending on whether the kernel service currently in the sleep state is a remote kernel service or a local kernel service. Note that if the required kernel service had been local, i.e., associated with application context 110, SAV file 112 associated with application context 110 would have governed the response to received signal # 9. In this case, the action code associated with received signal # 9 would have been "handler", as seen in SAV 112 of FIG. 3A. Accordingly, the response to received signal # 9 would have been a sequence that involves aborting the local kernel service and launching the handler.

Figure 3B:
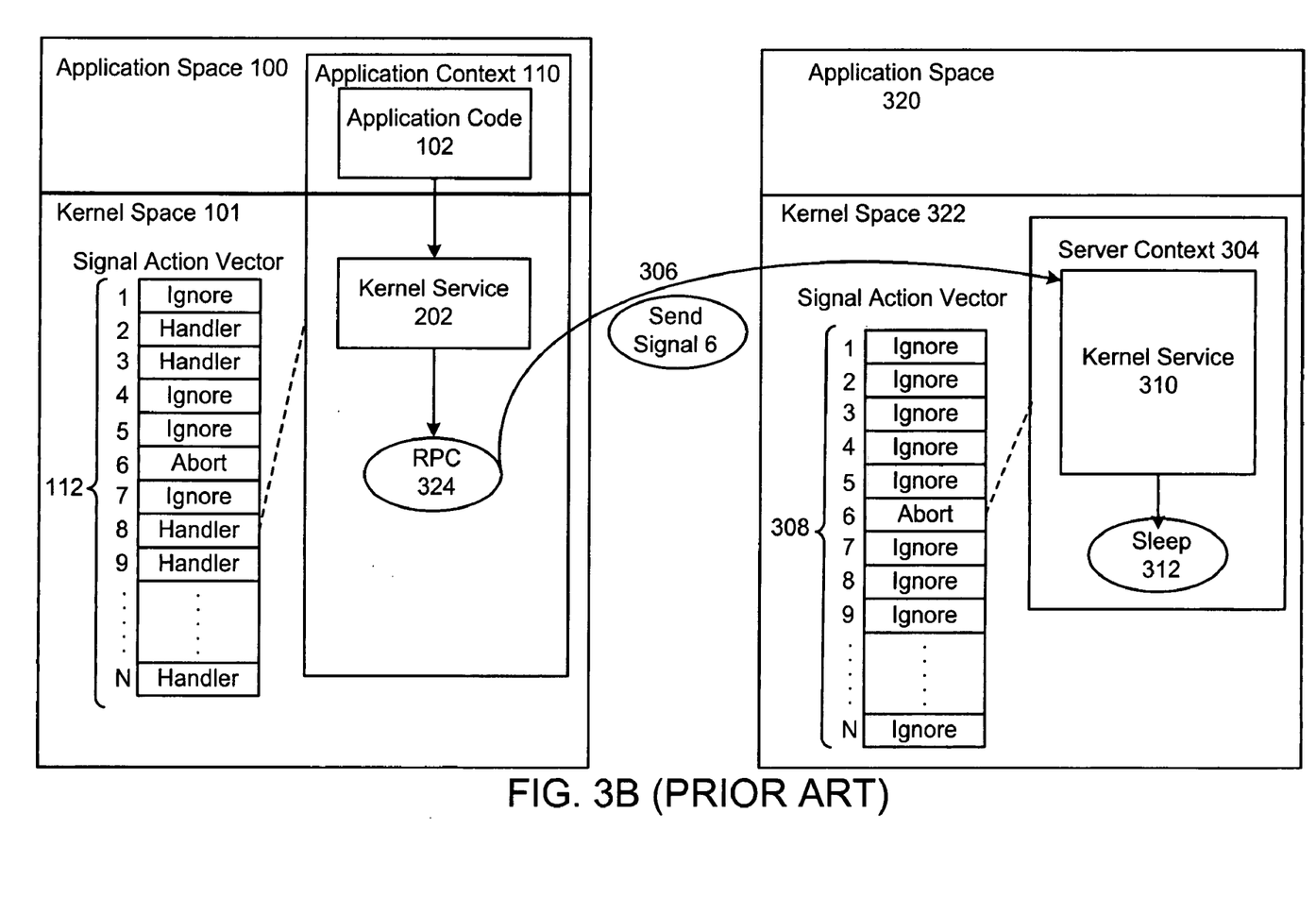

Instead, the required kernel service in the example of FIG. 3B is remote kernel service 310. As discussed, the response to received signal # 9 is governed by SAV file 308, which is associated with remote server context 304. The response is thus to ignore the received signal, since "ignore" is the action code associated with signal # 9 in SAV 308. The inconsistency in the response to the received signal is undesirable.

Prior art FIG. 3B shows a brute force approach to handling incoming signals when a kernel service is located remotely. Incoming signals are first translated into another signal number that ensures the abort of the remote kernel service. For example, if the local application context 110 receives a signal # 8 (which is associated with a handler), a signal # 6, which is special in that it always represents an abort, is sent instead to server context 304 associated with remote kernel service 310.

Thus, when the server context 304 receives signal # 6, the OS signal handling mechanism associated with server context 304 consults SAV file 308 and determines that the received signal # 6 represents an action code of abort (as always). As a result, kernel service 310 wakes from sleep state 312 (or wait state), cleans up its in-progress states, aborts and sends a response to the application context 110. Thereafter, local kernel service 202 may clean up its in-progress states, aborts and notifies the local OS of the abort. The OS then consults SAV file 112 and ascertains that the true received signal (i.e., signal # 8) corresponds to a handler action code. Accordingly, the handler code is launched.

Note that the approach taken by FIG. 3B guarantees that the remote kernel service, which is in its sleep state, will be aborted in a brute force fashion when another signal is received at the local application context. However, this approach is inherently inefficient since not all received signals should result in the abort of the sleeping remote kernel service.

For example, a kernel service (whether remote or local) may sometimes wish to temporarily mask a particular signal in its associated SAV file so that the receipt of that signal will be temporarily ignored. Suppose that a local kernel service had been available in application context 110 and could have been employed to perform the operation requested by application code 102. In this case, that local kernel service may wish to mask a signal # 5 when it enters the sleep mode so that the receipt of signal # 5 would not cause the local kernel service to be aborted. Accordingly, the action code associated with signal #5 would have been temporarily set to "ignore" in the associated SAV file 112. Thus, while the local kernel service is in its sleep mode, the receipt of a signal # 5 would be ignored, as governed by SAV file 112.

However, when a remote kernel service is employed, a remote SAV governs the response to the received signal. For example, remote kernel service 310 may wish to mask a signal # 5 when it enters the sleep mode so that the receipt of signal # 5 would not cause remote kernel service 310 to be aborted. Accordingly, the action code associated with signal # 5 is temporarily set to "ignore" in the associated SAV file 308.

However, the approach taken by FIG. 3B would have caused the received signal # 5, which is received at application context 110, to be translated to a signal # 6 prior to being sent from application context 110 to server context 304. Signal action # 6 always corresponds to an abort action code, causing the abort to be performed in a brute force fashion.

Again, there is a discrepancy in the way received signal # 5 is handled, which discrepancy depends on whether the kernel service is a remote kernel service or a remote kernel service. This discrepancy is also not desirable since it involves uncertainty with respect to how a received signal is handled.

In accordance with embodiments of the present invention, there are provided techniques for consistently and efficiently handling signals received at an application context while a kernel service executing on behalf of that application context is in a sleep mode. The signal is handled consistently irrespective of whether the kernel service is a local kernel service or a remote kernel service.

Figure 4A:
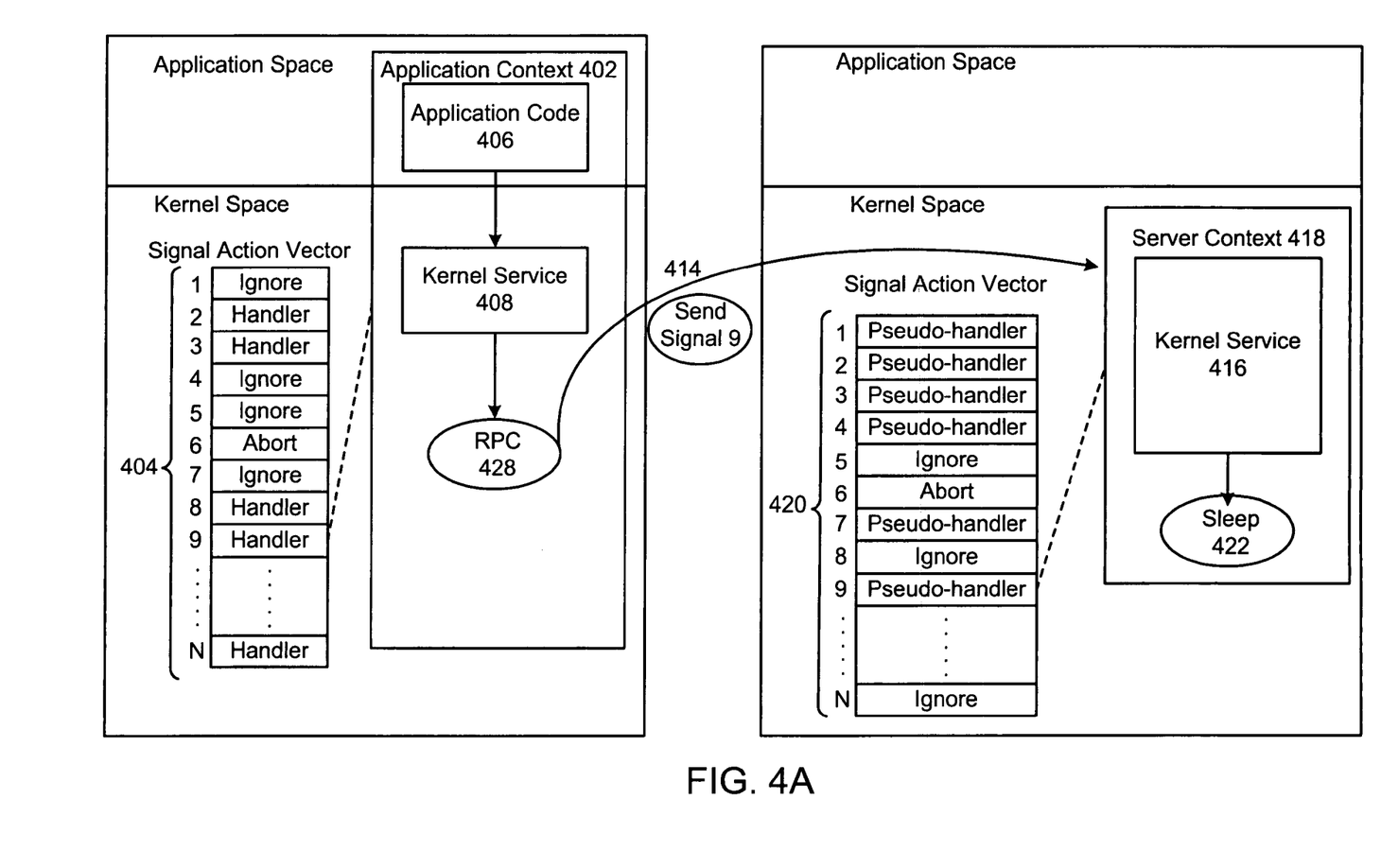
FIG. 4A and FIG. 4B illustrates, in accordance with an embodiment of the present invention, signal coordination with remote services and how the same two scenarios in prior art

The features and advantages of the present invention may be better understood with reference to the figures and discussions that follow. FIG. 4A shows, in an embodiment of this invention, how a signal received at a local application context is handled when the remote kernel service is in the sleep mode.

In FIG. 4A, application code 406 associated with an application context 402 makes a call into a kernel service 408, which in turn employs a remote procedure call (RPC) 428 to invoke a remote kernel service 416 associated with server context 418. In an embodiment, when a kernel service associated with a server context is called by a remote procedure call (RPC), that server context sets up a pseudo-handler signal action vector (SAV) file. With reference to FIG. 4A, pseudo-handler SAV file 420 is set up by server context 418 when kernel service 416 is invoked via RPC 428. Initially, as will be seen later in FIG. 5A, all entries in the SAV file 420 are set to pseudo-handler (except for entry #6, which is always abort). In FIG. 4A, entries for signals 5, 8, and N, exhibit the ignore action. This is to represent that kernel service 416, as part of its operation, temporarily ignores these signals.

As the term is employed herein, a pseudo-handler is an action value that mimics a handler address. Unlike a real handler, however, the pseudo-handler value does not point to a real application code address. Instead, the pseudo-handler has a value that preferably does not correspond to any meaningful address. The existence of a pseudo-handler fools the signal handling mechanism of the operating system (OS) that is associated with remote server context 418 to take actions similar to those employed to handle a real handler, i.e., abort the current operation. However, since server context 418 is not associated with a real application code, no handler is launched after the current operation is aborted.

After the pseudo-handlers are set up in SAV 420, kernel service 416 executes. Suppose that kernel service 416 enters into a sleep (or wait) state 422. While in this wait state, a signal # 9 is received at local application context 402. As before, the OS signal handling mechanism associated with application context 402 consults a SAV file 404 to determine the next course of action. Since the action code associated with signal # 9 is "handler," the current operation needs to be aborted to launch the handler code. In this case, the signal #9 will be forwarded to server context 418.

When server context 418 receives a signal # 9, the OS signal handling mechanism associated with server context 418 consults with pseudo-handler SAV file 420 and determines that signal # 9 corresponds with a pseudo-handler therein. Accordingly, the OS associated with server context 418 handles this situation as it would when a signal is received and that signal is associated with a real handler. That is, the OS associated with server context 418 would cause remote kernel service 416 to wake up, clean up its in-progress states, abort, and would attempt to launch the pseudo-handler associated with received signal # 9.

However, since the server context 418 is not associated with a real application code, no handler routine is actually launched. However, the abort of remote kernel service 416 allows local kernel service 408 to be aborted in turn. After local kernel service 408 aborts, the OS associated with application context 402 launches the handler code starting at the application code address specified by the handler value associated with received signal # 9 in SAV file 404.

Note that if the required kernel service were a local kernel service, i.e., associated with application context 402, the same result would occur. In other words, the OS signal handling mechanism would wake up and abort all the required local kernel service and launch the handler code starting at the application code address specified by the handler value associated with received signal # 9 in SAV 404. Accordingly, there is consistency in the manner with which an incoming signal is handled irrespective whether the kernel service in the sleep mode is a local kernel service or a remote kernel service.

Figure 4B:
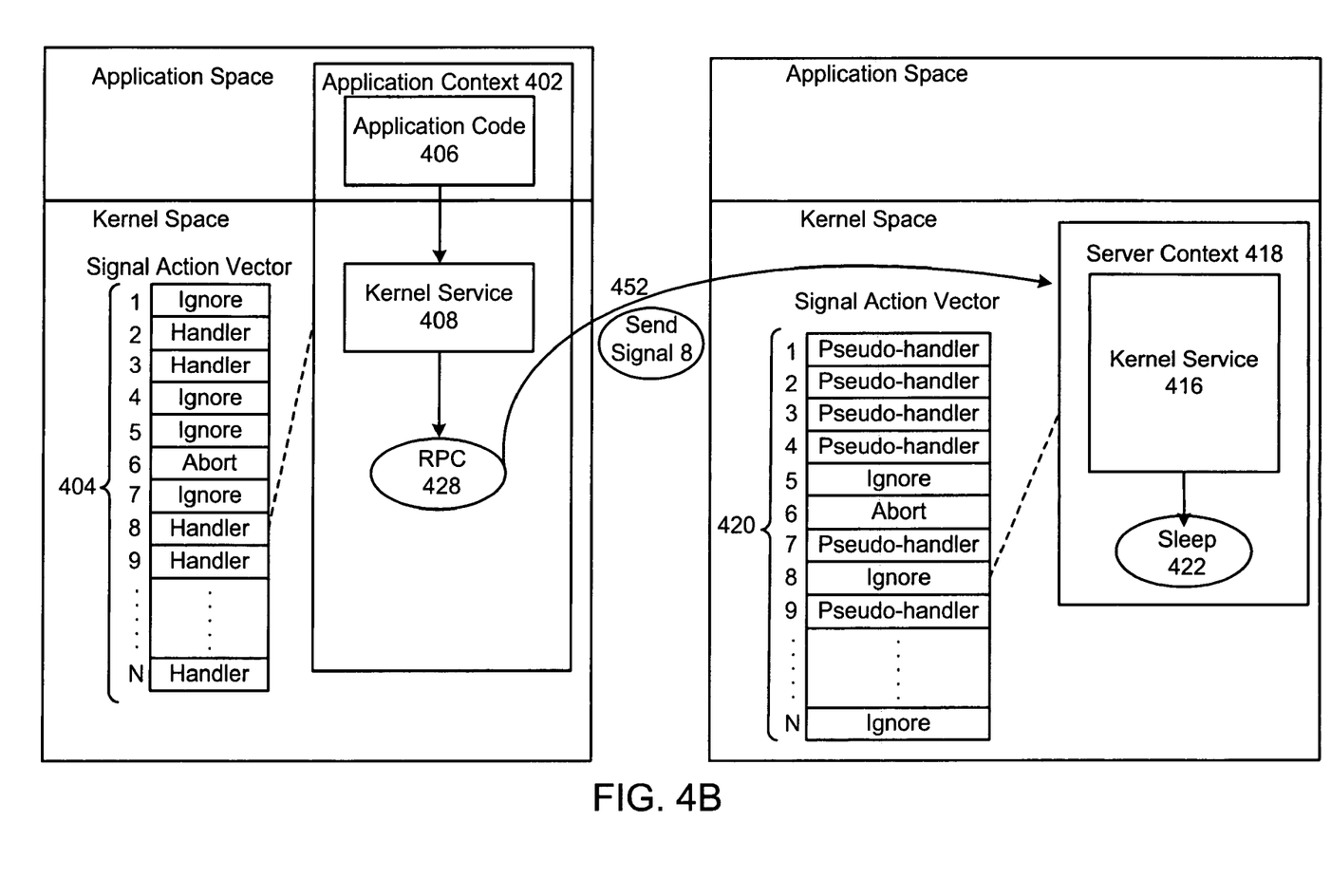

In FIG. 4B, suppose signal # 8 is received while remote kernel service 416 is in its sleep mode. However, remote kernel service 416 dynamically and temporarily masks signal # 8 in SAV file 420 so that the receipt of signal # 8 would not disturb remote kernel service 416. This is possible because a signal associated with a pseudo-handler may be dynamically and temporarily masked, i.e., has its value temporarily changed to an "ignore" action code. For example, the kernel service (such as remote kernel service 416) may wish to mask one or more signals while it is executing. Since a pseudo-handler has the format of a handler, the OS signal handling mechanism masks and unmasks a signal having a pseudo-handler in the same manner that the OS would a signal having a real handler. In fact, when a signal having a pseudo-handler is temporarily masked, it is handled by the OS signal handling mechanism in the same manner that the OS would a signal having a real handler.

Before discussing how the receipt of signal # 8 would impact remote kernel service 416, consider the situation if the kernel services had all been local-to-local application context 402. If all kernel services had all been local to local application context 402 (i.e., no remote kernel service is required), the masking of signal # 8 by the kernel service would cause signal # 8 to be temporarily masked (i.e., its associated action code temporarily changed to "ignore") with local SAV file 404. In this case, the receipt of signal # 8 would have been ignored.

This response to received signal # 8 should be consistent when the kernel service is remote. Referring back to FIG. 4B, remote kernel service 416 masks signal # 8 in remote SAV file 420 prior to entering sleep state 422. In this case, when signal #8 is received by application context 402, the OS signal handling mechanism associated with application context 402 consults local SAV file 404 and ascertains that the action code associated with signal # 8 is "handler." Accordingly, the OS associated with application code 402 needs to abort the current operation in order to launch the handler code found associated with signal # 8 in SAV file 404.

Signal # 8 is then forwarded to remote server context 454. The OS handling mechanism associated with remote server context 454 consults with SAV file 420 to ascertain that the action code associated with signal # 8 is set to "ignore" (since remote kernel service 416 temporarily masked signal # 8 prior to entering sleep mode 422). Accordingly, received signal # 8 is ignored and remote kernel service 416 is not aborted. Note that this response to received signal # 8 is advantageously consistent with the response that would have taken place had all the kernel services been associated with local application context 402.

Figure 5A:
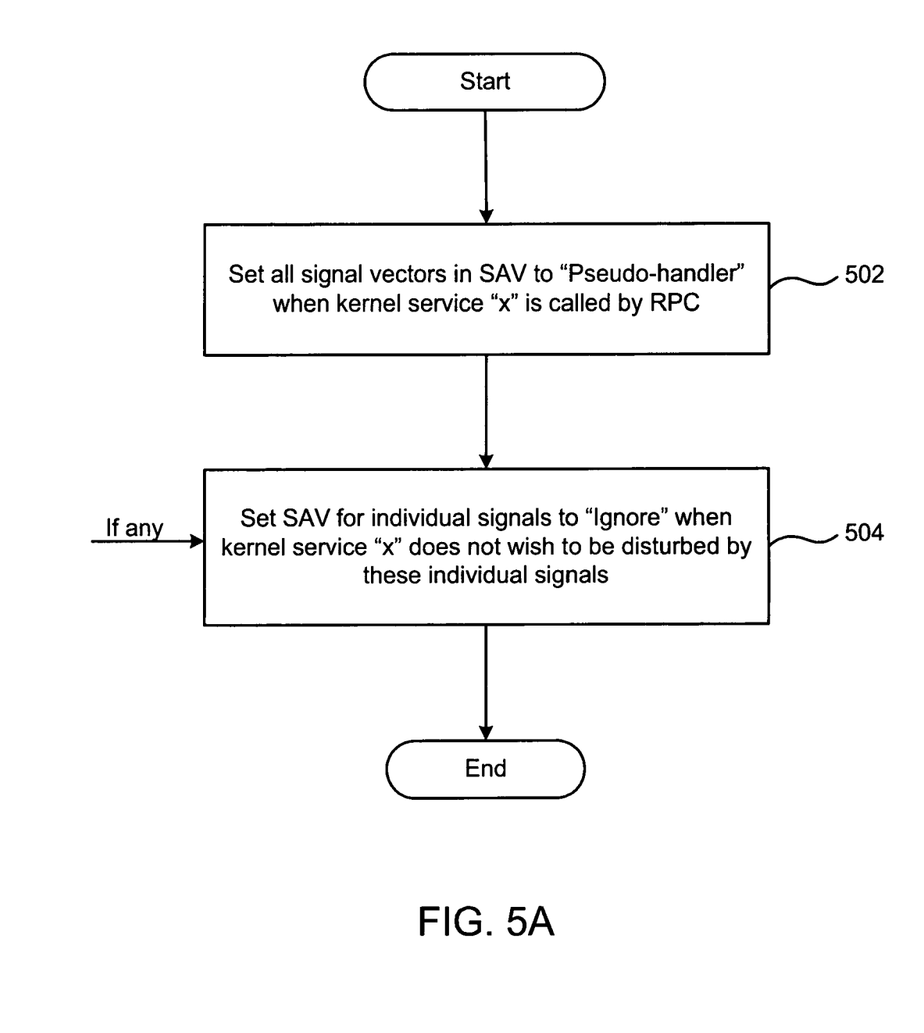
FIG. 5A and FIG. 5B shows, in accordance with an embodiment of the present invention, flowcharts of the signal coordination mechanism.

FIG. 5A shows, in accordance with an embodiment of the present invention, the steps taken to initialize and subsequently modify a signal action vector (SAV) file associated with a remote kernel service. In step 502, all signal vector entries are set to pseudo-handlers when a kernel service is first initialized by a call such as a remote procedure call (except, perhaps, for a special entry which should always be set to "abort"). If desired, in step 504, SAV entries associated with certain signal numbers may be temporarily changed to another action code subsequently, such as ignore, if the remote kernel service or the OS associated with the remote kernel service does not wish to be disturbed by these signals.

Figure 5B:
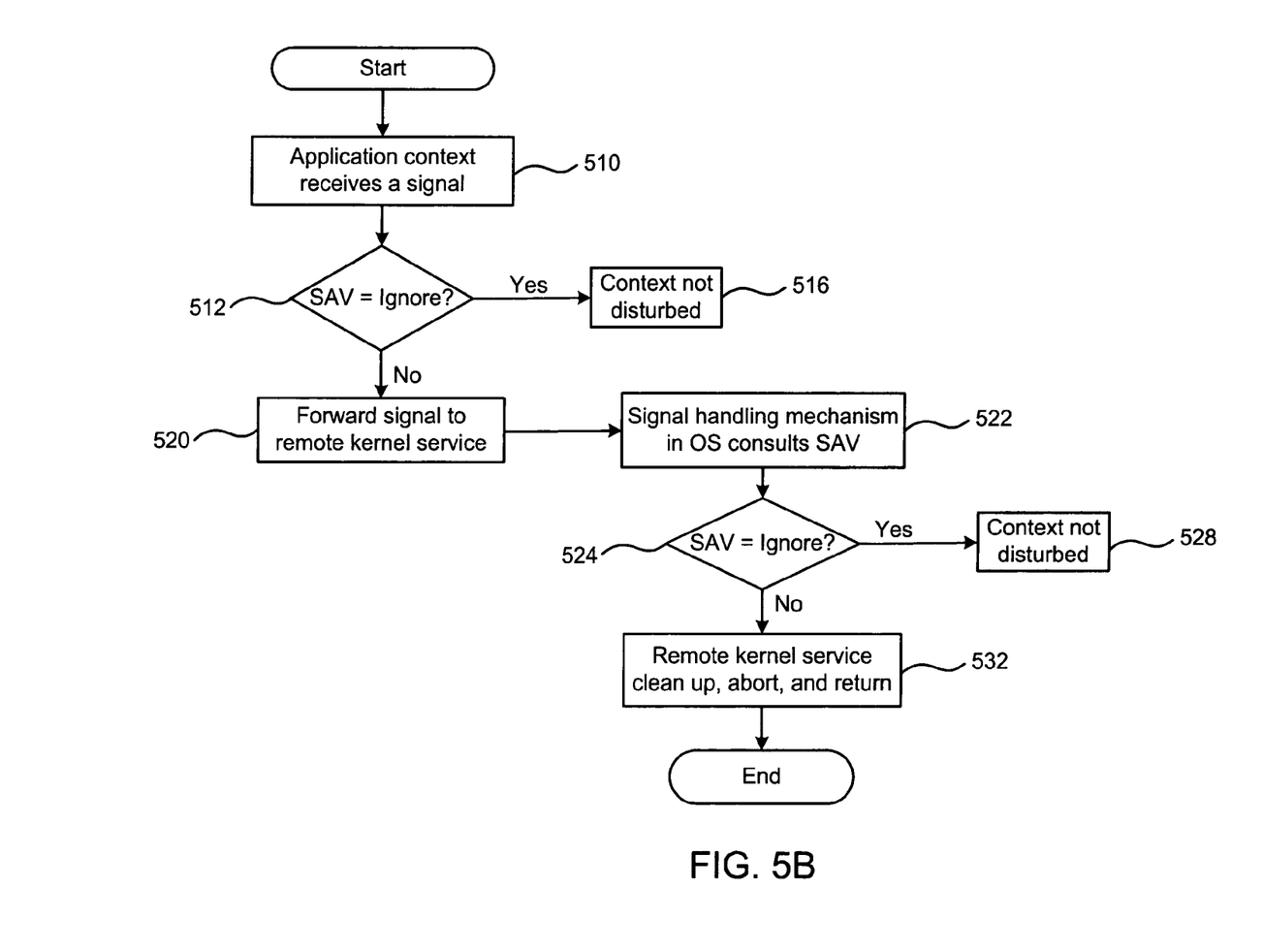

FIG. 5B depicts a flow chart, in accordance with an embodiment of the invention, of the steps involved in handling a signal received while a remote kernel service is in its sleep state. In step 510, an application context receives a signal. At step 512, the OS signal handling mechanism associated with the application context checks the signal against a signal action vector file. If the signal corresponds to a signal vector entry that has an action code of ignore, then the context is not disturbed (step 516).

However, if the signal corresponds to a signal vector entry that does not equal to an action code of ignore (such as handler or abort), then the OS signal handling mechanism proceeds to step 520 in which the signal is forwarded to a remote kernel service located in a remote server context. The remote kernel service may be on the same node but in a different context, or the remote kernel service may be in a different node entirely.

Upon receipt of the signal, the OS signal handling mechanism associated with the remote kernel service, in step 522, consults with a remote SAV file associated with the remote server context. At step 524, if the signal corresponds to a signal vector entry that has an action code of ignore in the remote SAV file, then the context is not disturbed (step 528). The context remains undisturbed until the remote kernel service or the OS associated with the remote kernel service changes the remote SAV file entry back to its original state. However, if the received signal corresponds is associated with an action code other than ignore (such as pseudo-handler), then the OS signal handling mechanism, in step 532, wakes up the remote kernel service. The remote kernel service cleans up its in-progress states, aborts and sends a response back to the calling context (which may be the application context or an intermediate kernel context), which may then handle the signal that has been received.

As can be appreciated from the foregoing, embodiments of the invention enable a received signal to be handled the same way irrespective whether the kernel service is located locally or remotely. Further, the application context no longer has to send, as was done in the prior art, a "hard-coded" abort signal to the remote kernel service irrespective of which signal is actually received by the application context. Another advantage of the invention is that the present invention does not require the entire SAV file associated with the application context to be copied into the server context so that the kernel service operates with the same signal action states as the application context. By eliminating the need for such wholesale copy of the SAV file, there is no wasting of bandwidth for the needless copy operations.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method, implemented in a computer, for handling a signal received at an application context, said application context employing a first remote kernel service implemented in a first server context, comprising:

receiving at said first remote kernel service in the computer, from said application context, a first signal corresponding to the signal received at said application context, wherein said application context is different from said first server context in which said first remote kernel service resides;

ascertaining, using a first signal action vector file associated with said first server context, a first action code associated with said first signal, wherein said first signal action vector file has entries corresponding to a plurality of pseudo-handlers that are not associated with any meaningful address;

if said first action code represents a particular one of the pseudo-handlers, aborting said first remote kernel service;

ascertaining, prior to sending said first signal from said application context to said first remote kernel service, a second action code associated with said first signal; and ignoring said first signal, thereby causing said first signal not to be sent from said application context to said first remote kernel service, if said second action code represents an ignore action.

2. The method of claim 1 wherein said aborting includes informing an entity that called said first remote kernel service that said first remote kernel service has been aborted.

3. The method of claim 1 wherein said first remote kernel service is called from a second kernel service that is implemented on a second server context different from said application context and said first server context.

4. The method of claim 1 wherein said first remote kernel service is called from application code associated with said application context.

5. The method of claim 1, wherein ascertaining the second action code uses a second signal action vector file associated with said application context.

6. The method of clam 1, further comprising sending said first signal from said application context to said first server context, wherein a signal number of said first signal is the same as a signal number of the signal received at said application context.

7. A computer system comprising:
programmable circuits; and
a computer readable storage medium storing instructions that upon execution by the programmable circuits cause the programmable circuits to:
receive a remote procedure call at a server context, said remote procedure call representing a request to employ a kernel service in said server context on behalf of a calling entity associated with an application context that is different from said server context;
in response to the remote procedure call, establish a first signal action vector associated with said server context, wherein said first signal action vector has plural action codes corresponding to plural respective signals, wherein multiple ones of the plural action codes correspond to pseudo-handlers, and wherein each of said pseudo-handlers mimics a handler address without corresponding to a meaningful address;
receive, at said server context from said application context, a first signal;
in response to said first signal, consult said first signal action vector;
abort a wait state of said kernel service if said first signal corresponds to a particular one of the pseudo-handlers in said first signal action vector;
over-write a given pseudo-handler in said first signal action vector with an "ignore" action code;
receive, at said server context from said application context, a second signal;
in response to said second signal, consult said first signal action vector; and
in response to determining that said second signal corresponds to an entry that has the "ignore" action code, ignore said second signal at said server context.

8. The computer system of claim 7 wherein at least one entry of said first signal action vector includes an "abort" action code, said "abort" action code representing an action code that causes said kernel service to abort a current wait state if a signal received from said application context corresponds to the entry of said first signal action vector that includes said "abort" action code.

9. The computer system of claim 7 wherein none of the pseudo-handlers points to an application address.

10. The computer system of claim 7 wherein none of the pseudo-handlers points to a valid application address.

11. A method, implemented in a computer, for handling a signal received at an application context, said application context employing a first remote kernel service implemented in a first server context, comprising:
receiving at said first remote kernel service in the computer, from said application context, a first signal corresponding to the signal received at said application context, wherein said application context is different from said first server context in which said first remote kernel service resides;
ascertaining, using a first signal action vector file associated with said first server context, a first action code associated with said first signal, wherein said first signal action vector file has entries corresponding to a plurality of pseudo-handlers that are not associated with any meaningful address;
if said first action code represents a particular one of the pseudo-handlers, aborting said first remote kernel service;
attempting to launch the particular pseudo-handler after the aborting, wherein no real handler is launched at said first server context as a result of the attempting;
after the aborting of said first remote kernel service, aborting an entity in said application context, wherein the entity called said first remote kernel service; and
after aborting said entity, launching, at said application context, a handler indicated by a second signal action vector file associated with said application context, wherein the launched handler is identified by an entry in said second signal action vector file corresponding to the first signal sent from said application context to said first server context.

12. The method of claim 11, wherein the entity comprises one of application code and a kernel service residing in said application context.

13. A computer system comprising:
programmable circuits; and
a computer readable storage medium storing instructions that upon execution by the programmable circuits cause the programmable circuits to:
receive a remote procedure call at a server context, said remote procedure call representing a request to employ a kernel service in said server context on behalf of a calling entity associated with an application context that is different from said server context;
in response to the remote procedure call, establish a first signal action vector associated with said server context, wherein said first signal action vector has plural action codes corresponding to plural respective signals, wherein multiple ones of the plural action codes correspond to pseudo-handlers, and wherein each of said pseudo-handlers mimics a handler address without corresponding to a meaningful address;
receive, at said server context from said application context, a first signal;
in response to said first signal, consult said first signal action vector;
abort a wait state of said kernel service if said first signal corresponds to a particular one of the pseudo-handlers in said first signal action vector;
attempt to launch the particular pseudo-handler after the aborting, wherein no real handler is launched at said server context as a result of the attempting;
after the aborting of the wait state of said kernel service, abort the calling entity associated with said application context; and
after aborting said calling entity, launch, at said application context, a handler indicated by a second signal action vector that is associated with said application context, wherein the launched handler is identified by an entry in said second signal action vector corresponding to said first signal sent from said application context to said server context.

14. The computer system of claim 13, wherein the calling entity comprises one of application code and a kernel service residing in said application context.

15. An article of manufacture comprising a computer readable storage medium storing instructions that upon execution cause a computer system to:

receive a remote procedure call at a server context, said remote procedure call representing a request to employ a kernel service in said server context on behalf of a calling entity associated with an application context that is different from said server context;

in response to the remote procedure call, establish a first signal action vector associated with said server context, wherein said first signal action vector has plural action codes corresponding to plural respective signals, wherein multiple ones of the plural action codes correspond to pseudo-handlers, and wherein each of said pseudo-handlers mimics a handler address without corresponding to a meaningful address;

receive, at said server context from said application context, a first signal;

in response to said first signal, consult said first signal action vector;

abort said kernel service if said first signal corresponds to a particular one of the pseudo-handlers in said first signal action vector;

attempt to launch the particular pseudo-handler after the aborting, wherein no real handler is launched at said server context as a result of the attempting;

after aborting said kernel service, abort the calling entity associated with said application context; and after aborting said calling entity, launch, at said application context, a handler indicated by a second signal action vector that is associated with said application context, wherein the launched handler is identified by an entry in said second signal action vector corresponding to said first signal sent from said application context to said server context.

16. The article of manufacture of claim 15 wherein the instructions upon execution cause the computer system to further inform the calling entity that said kernel service has been aborted.

17. The article of manufacture of claim 15 wherein said calling entity is a second kernel service that is local to said application context.

18. The article of manufacture of claim 15 wherein said remote procedure call is from application code associated with said application context, and wherein said calling entity includes the application code.

19. The article of manufacture of claim 15, wherein the instructions upon execution cause the computer system to further:

receive a signal at said application context; and send the first signal from said application context to server context in response to receiving the signal at said application context, wherein the first signal has a signal number that is the same as a signal number of the signal received at said application context.

20. The article of manufacture of claim 15, wherein the instructions upon execution cause the computer system to further:

provide a second signal action vector associated with said application context, wherein the second signal action vector has plural action codes corresponding to the plural respective signals; and send said first signal from said application context to said server context after first consulting said second signal action vector, wherein an entry of said second signal action vector corresponding to said first signal has an action code corresponding to a real handler instead of the particular pseudo-handler indicated by the first signal action vector.

21. A computer system comprising:

programmable circuits; and a computer readable storage medium storing instructions that upon execution by the programmable circuits cause the programmable circuits to:

receive a remote procedure call at a server context, said remote procedure call representing a request to employ a kernel service in said server context on behalf of a calling entity associated with an application context that is different from said server context;

in response to the remote procedure call, establish a first signal action vector associated with said server context, wherein said first signal action vector has plural action codes corresponding to plural respective signals, wherein multiple ones of the plural action codes correspond to pseudo-handlers, and wherein each of said pseudo-handlers mimics a handler address without corresponding to a meaningful address;

receive, at said server context from said application context, a first signal;

in response to said first signal, consult said first signal action vector;

abort a wait state of said kernel service if said first signal corresponds to a particular one of the pseudo-handlers in said first signal action vector;

receive a signal at said application context; and send said first signal from said application context to said server context in response to receiving the signal at said application context, wherein said second signal has a signal number that is the same as a signal number of the signal received at said application context.

* * * * *